US007007227B1

(12) United States Patent
Constantino et al.

(10) Patent No.: US 7,007,227 B1
(45) Date of Patent: Feb. 28, 2006

(54) CONTRACT HANDLING METHOD AND SYSTEM

(75) Inventors: Peggy Ann Constantino, Pleasant Valley, NY (US); John Peter O'Connor, Danbury, CT (US); Allison Marie McCormack, Hopewell Jct., NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,707

(22) Filed: Nov. 24, 1999

(51) Int. Cl.
*G06F 17/00* (2006.01)

(52) U.S. Cl. ......................... 715/500; 715/505; 705/80

(58) Field of Classification Search ................ 715/505, 715/506, 530, 539, 500; 705/4, 35, 37, 80
See application file for complete search history.

(56) References Cited

U.S. PATENT DOCUMENTS 4,831,526 A 5/1989 Luchs et al. ................ 364/401
5,216,603 A 6/1993 Flores et al. ................ 364/419
5,272,623 A 12/1993 Grubb et al. ............... 364/401
5,446,653 A * 8/1995 Miller et al. .................... 705/4
5,692,206 A 11/1997 Shirley et al. .............. 395/793
5,717,989 A 2/1998 Tozzoli et al. ................ 705/37
5,898,838 A 4/1999 Wagner ................. 395/200.54
6,067,531 A * 5/2000 Hoyt et al. ................... 705/35
6,236,984 B1 * 5/2001 Owens et al. .................. 707/1
6,338,050 B1 * 1/2002 Conklin et al. ............... 705/80
6,502,113 B1 * 12/2002 Crawford et al. ........... 715/530

OTHER PUBLICATIONS

Moseley, Lonnie E. and Boodey, David M. Mastering Microsoft Office 97 Professional Edition, Second Edition Sybex 1996, esp. p. 783-798.*

"Material Logistics System," Giles, R.W. and Shurson, KD, IBM Technical Disclosure Bulletin, Sep. 1986, p. 1526-1530.

"Frequently Asked Questions About Your Virtual Agent Network for Worldwide Business!", Australian American Chamber of Commerce, 1996, 20 p. www.an2acc.com/VirtualAgent FAQ.htm.

* cited by examiner

*Primary Examiner*—Sanjiv Shah
(74) *Attorney, Agent, or Firm*—Schmeiser, Olsen & Watts; William E. Schiesser

(57) ABSTRACT

The contract handling method and system of the present invention permits contract owners to handle execution of contracts. Contracts and statements of work (SOW) are created in a document assembler using model agreements, alternate clauses, and supplemental provisions. A tracker tool notifies the owner of a master contract whenever a SOW is issued against the master agreement. Expiration dates are tracked and reminders sent via e-mail to contract and SOW owners as specified. A participation agreement can be entered and issued once a master contract is executed. The master contract owner is prevented from closing a master contract until all applicable SOW's are also closed.

28 Claims, 2 Drawing Sheets

CONTRACT HANDLING METHOD AND SYSTEM

TECHNICAL FIELD

The invention relates in general to a method and system for the handling of contract documents. In particular the invention relates to an on-line method and system for facilitating the creation of master contracts and associated statements of work (SOW) and for handling and tracking their assembly, execution, and closure.

BACKGROUND OF THE INVENTION

Use of a computer system for assisting in the generation of a contract has been disclosed in several patents. Luchs et al. in U.S. Pat. No. 4,831,526 describe a computerized system for preparing and writing insurance contracts requested by clients. An operator uses a terminal and display to enter and view information into a data bank in a processor. The processor merges selected client information with standard contract provisions which apply to this client to compile and print final insurance contract documents tailored to each client.

Grubb et al. in U.S. Pat. No. 5,272,623 describe a software program and five data base logic tables to produce tailored government contracting documents. An operator enters data into a menu-driven computer system, then selects one or more categories from a database, and then answers one or more logic questions. The computer system performs a logic analysis of the data, the category and the answers to the logic questions using the logic tables mentioned above. The computer system then generates a tailored government contracting document. The document contains selected government agency regulation clauses located in the proper sections of the document.

Shirley et al. in U.S. Pat. No. 5,692,206 describe an automated contract generation system which provides standard documents that can be customized for each deal. The system includes an authoring unit for selecting and editing a standard contract and auxiliary documents including selecting alternate, supplemental, and additional provisions from libraries. The system also includes a legal advisor coupled to the authoring unit, having explanations or definitions relating to the provisions in the contract document which may be displayed in response to a request from a user of the system.

In a large corporation having multiple sites or locations it is a common business practice to generate a master contract with another company. After agreement is reached, the contract is signed, approved, and enters a status known as executed. Individual units within the corporation may then issue a statement of work (SOW) under the master contract. The SOW describes in detail a specific project with the other company. Multiple SOW's can be issued by various sites at various times for varied durations. Handling and tracking these SOW's and coordinating changes to SOW's with the master contract which may also be changed is therefore a difficult and time consuming activity for which the systems described above for initially generating a contract unfortunately provide no solution.

In accordance with the teachings of the present invention, however, there is provided a method and system for handling this complex execution activity in conjunction with facilitating master contract and SOW generating tasks. It is believed that such a system and method would constitute a significant advancement in the art.

OBJECTS AND SUMMARY OF THE INVENTION

It is therefore a principal object of the present invention to enhance the contract handling art by providing a system for generating and executing master contacts and SOW's.

It is another object to provide a system wherein enhanced handling of multiple SOW's is possible.

It is a further object to provide such a system which operates across multiple sites using multiple languages within a corporation.

It is yet another object of the invention to provide a method for handling contracts in a facile manner.

These and other objects are attained in accordance with one embodiment of the invention wherein there is provided a contract handling system, comprising, an entry tool for entering a client request or a client inquiry, one or more model agreements, a document assembler for selecting and merging all or part of the one or more model agreements into a contract in response to the client request, a tracker tool coupled to the entry tool and the document assembler for processing key date reminders and approvals into tracking data, and a repository for storing the contract and the tracking data and for responding to the client inquiry.

In accordance with another embodiment of the invention there is provided a method of handling contracts, comprising the steps of, entering a client request into an entry tool, selecting one or more model agreements from a library of model agreements, assembling and merging all or part of the one or more model agreements into a contract in response to the client request in the entry tool, processing key date reminders and approvals into tracking data, and storing the contract and the tracking data in a repository.

BEST MODE FOR CARRYING OUT THE INVENTION

For a better understanding of the present invention together with other and further objects, advantages, and capabilities thereof, reference is made to the following disclosure and the appended claims, in connection with the above-described drawings.

Figure 1:
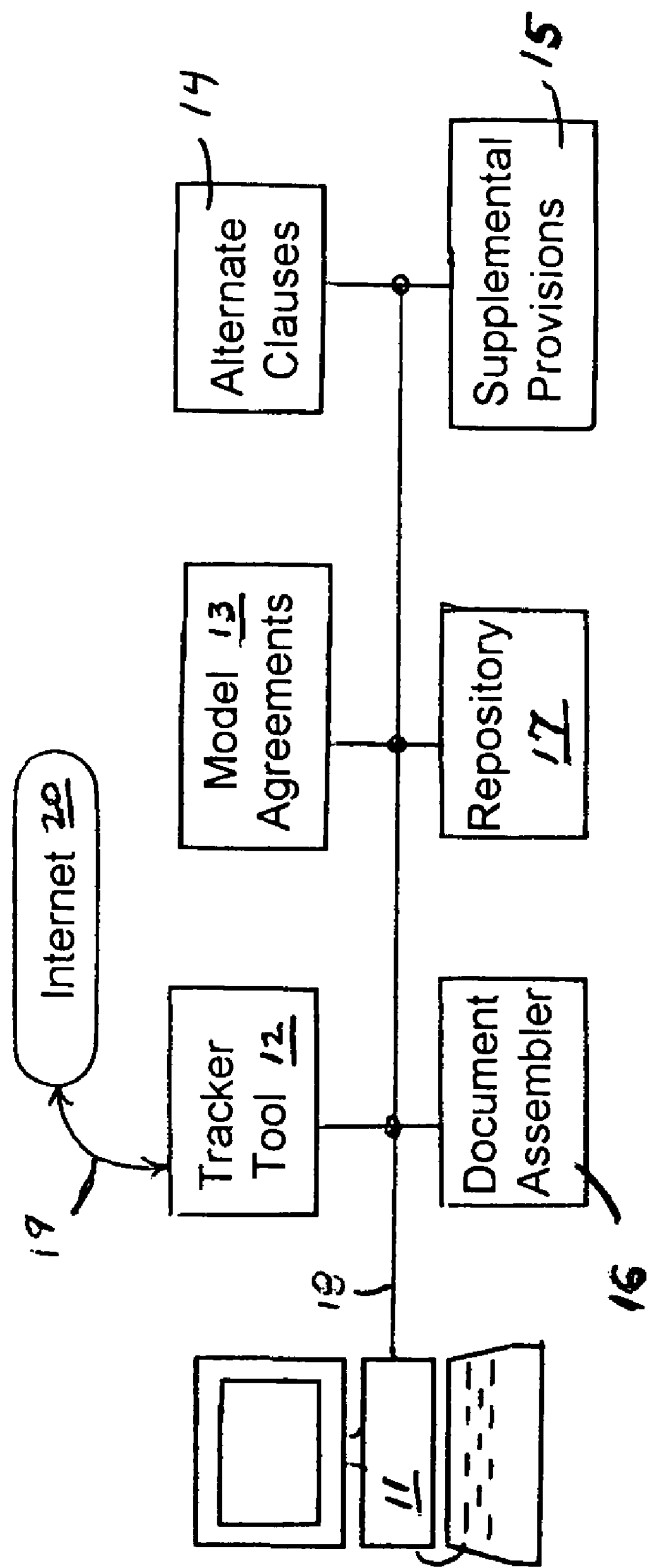
FIG. 1 is a block diagram showing the elements of the contract handling system in accordance with the present invention.

In FIG. 1 there is shown a block diagram of a system for handling contracts. An entry tool 11 may be a personal computer with display and keyboard as shown running software for data entry. Entry tool 11 may also be a terminal attached to a host computer or mainframe with data entry softare running on the host computer. Entry tool 11 may also include various data entry devices and positioning devices to facilitate positioning a cursor or selecting objects, such as a trackball, mouse, scanner, bar code reader or other data entry devices used in the data processing industry for entry of data. Any software which is part of entry tool 11 may be general purpose software such as word processing software, spreadsheet software, graphical software or any other type of data entry software whether developed for general purpose use or specifically developed for use in the contract handling system of the present invention. A client or user can enter a request to create a contract or a SOW using data entry tool 11. The client may also enter an inquiry such as a status inquiry or an inquiry of all current SOW's entered under a particular contract.

Document assembler 16 is coupled to entry tool 11 via connection 18 which serves to interconnect the various elements of the contract handling system. Connection 18 provides a path for communication between the elements and may have any appropriate structure depending on the embodiments and locations of the elements. For example, if all elements are located on a personal computer attached to the internet, then connection 18 may be merely a computer bus located within the personal computer which interconnects the storage, processing, and I/O units on which the elements of the contract handling system are embodied. Some elements may be located remotely in which case connection 18 may comprise a network connection between the remote locations of the servers or client processors on which the elements reside. Document assembler 16 is also coupled to model agreements 13 as well as a library of alternate clauses 14 and a library of supplemental provisions 15 all of which are stored in the contract handling system. Document assembler 16 is structured as software and/or hardware for selecting and merging all or part of one or more model agreements into a contract in response to requests entered by a user via entry tool 11. The model agreements, alternate clauses and supplemental provisions are preferably pre-approved so that the user may select and merge together a contract of pre-approved terms thereby minimizing and in many cases eliminating any need for further approval within his corporation of this particular tailored contract. The contract is subsequently stored in repository 17 which may be any type of data storage such as a hard drive, writable CD or DVD ROM drive, magnetic tape, or floppy disk. It may also be a mass storage facility accessible by the contract handling system via a network, dial up, telecommunication, radio or other type of connection used for data connection. Other users located at the same site or any other site may also access the contract in repository 17 using the contract tool or by using another copy of the contract tool installed at a remote site, connected to the contract tool via such a telecommunication connection as just described or via an internet connection to be described below. Document assembler 16 is also used with entry tool 11 to enter a SOW under a previously assembled contract. The user and site entering a SOW do not need to coincide with the user and site where the contract was originally assembled nor do they need to coincide with the site where the contract is stored in repository 17.

Tracker tool 12 is coupled to document assembler 16, entry tool 11, and repository 17 via connection 18. Key dates are listed in a master contract or more importantly in a SOW at the time of entry or at any other time using entry tool 11. Tracker tool 12 processes key dates by sending a reminder to the master contract owner or SOW owner prior to the key date e.g. 30, 60, or 90 days prior. If approvals or other action is required by the key date, the owner can then insure that the action is completed. Tracker tool 12 sends the reminders via e-mail using connection 19 to the internet 20 or via any other telecommunication connection as described above. Tracker tool 12 may also send a reminder note via e-mail to the master contract owner and all associated active SOW's owners prior to the expiration date of a master contract. Tracker tool 12 may also send a notice to the owner of the master contract whenever anyone issues a SOW against such master contract. In addition, if the owner makes an amendment of the master contract, all associated SOW owners are notified automatically of such amending by tracker tool 12. The owner of a master contract is prevented by tracker tool 12 from closing the agreement if an associated SOW is still open.

Tracker tool 12 may also provide a capability to create a routine contract. In cases where a standard contract is used with basically no requirement for assembly of provisions by Document Assembler 16, a client may request a standard contract be created by completing a request form provided by tracker tool 12. One example of a routine contract is a disclosure agreement contract. Tracker tool 12 passes the entries on the form through a series of audits and if the audits are passed successfully, a routine contract is created and stored in repository 17.

Tracker tool 12 may also include links to various databases within and external to the contract handling system. Examples of such links are name and address books, commodity codes, supplier databases, and contract type tables. Such links facilitate client lookup of data when required e.g. to fill out a form such as mentioned above.

Once a master contract is executed and stored in repository 17, tracker tool 12 permits a participation agreement to be entered by use of entry tool 11. A participation agreement allows another site or business entity, usually located in another country having differing or unique points of law requiring unique terms and conditions and using a different language, to perform business under the master contract.

Figure 2:
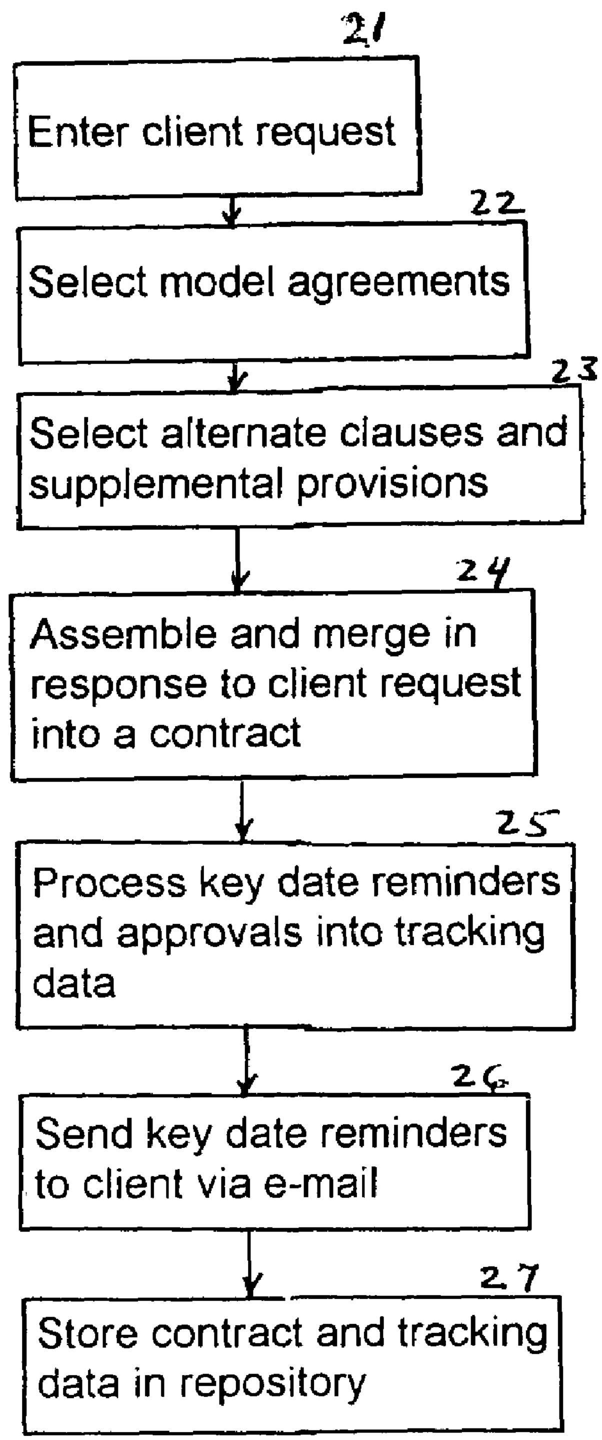
FIG. 2 is a flowchart showing a method of contract handling in accordance with another embodiment of the present invention.

In FIG. 2 an owner or client enters a request for a contract in step 21. In step 22 one or more model agreements 13 are selected. In step 23 the client may select one or more alternate clauses or one or more supplemental provisions from libraries 14 and 15 respectively. The model agreement(s), alternative clause(s), and supplemental provision(s) are merged into a contract in step 24 in response to the client request entered via entry tool 11. In step 25, key date reminders and approvals are processed into tracking data by tracker tool 12. The reminders are sent via e-mail to the client prior to the key dates in step 26. In step 27 the contract and tracking data are stored in repository 17. Note that although the steps of the flowchart in FIG. 2 are shown in sequential fashion, this is merely to ease explanation and understanding of the present invention. The steps of the present invention may be performed in any order limited only by the appended claims.

The invention as described above in thus deemed to constitute a significant advancement in the art. While there have been shown and described what are at present considered the preferred embodiments of the invnetion, it will be obvious to those skilled in the art that various changes and modificatons may be made therein without departing from the scope of the invention as defined by the appended claims.

What is claimed is:

1. A contract handling method relating to an executed master contract between a corporation and a company, said corporation comprising a plurality of units, said method comprising generating at least one statement of work (SOW) under the master contract, each SOW of the at least one SOW being associated with a corresponding unit of the plurality of units such that each SOW describes a project of its corresponding unit with the company, said generating comprising, for a SOW of the at least one SOW;

selecting one or more model agreements from a library of model agreements;

merging all or part of the one or more model agreements to form the SOW;

processing reminders of key dates for the SOW into tracking data;

storing the SOW and tracking data in a repository;

amending the master contract;

notifying all associated SOW owners of the at least one SOW of said amending; and wherein the master contract cannot be closed if any SOW of at least one SOW is still open.

2. The method of claim 1, said key dates for the SOW being listed in the SOW.

3. The method of claim 1, said method further comprising sending to the unit corresponding to the SOW a reminder of a first key date of the key dates, said reminder being automatically sent prior to an occurrence of the first key date.

4. The method of claim 3, said reminder being automatically sent via e-mail.

5. The method of claim 3, said first key date being a date of expiration of the master contract.

6. The method of claim 1, wherein the one or more model agreements were pre-approved by the corporation prior to said selecting such that further approval of the one or more model agreements by the corporation is not required to form the SOW.

7. The method of claim 1, said at least one SOW being a plurality of SOWs.

8. The method of claim 7, said method further comprising receiving an inquiry as to a status of each SOW of the plurality of SOWs.

9. The method of claim 1, said method further comprising sending a notice to the corporation upon formation of the SOW from said merging, said notice indicating that the SOW has been formed.

10. The method of claim 1, said selecting comprising selecting the one or more model agreements from model agreement in a plurality of languages.

11. The method of claim 1, said method further comprising selecting one or more alternate clauses from a library of alternate clauses and replacing part of the selected one or more model agreements with said one or more alternate clauses.

12. The method of claim 1, said method further comprising selecting a supplemental provision from a library of supplemental provisions and merging the supplemental provision into the SOW.

13. A contract handling system relating to an executed master contract between a corporation and a company, said corporation comprising a plurality of units, said system comprising:

a document assembler for selecting one or more model agreements from a library of model agreements and for merging all or part of the one or more model agreements to form a statement of work (SOW) under the master contract, said SOW being between associated with a unit of the plurality of units such that each SOW describes a project of the unit with the company;

a tracker tool for processing reminders of key dates for the SOW into tracking data;

repository for storing the SOW and the tracking data;

amending the master contract;

notifying all associated SOW owners of the at least one SOW of said amending and wherein the master contract cannot be closed if any SOW of at least one SOW is still open.

14. The system of claim 13, said key dates for the SOW being listed in the SOW.

15. The system of claim 13, said system further comprising means for sending to the unit a reminder of a first key date of the key dates.

16. The system of claim 13, wherein the one or more model agreements are pre-approved by the corporation such that further approval of the one or more model agreements by the corporation is not required to form the SOW.

17. The system of claim 13, said system further comprising means for sending a notice to the corporation upon formation of the SOW from said merging, said notice indicating that the SOW has been formed.

18. The system of claim 13, wherein the model agreements in the library of model agreements are in a plurality of languages.

19. The system of claim 13, said system further comprising a library of alternate clauses and a library of supplemental provisions, said library of alternate clauses and said library of supplemental provisions each being accessible to the document assembler, said library of alternate clauses comprising one or more alternate clauses adapted to replace part of the selected one or more model agreements, said library of supplemental provisions comprising one or more supplemental provisions adapted to be merged into the SOW.

20. A computer program product comprising a computer readable medium having a computer readable program code embodied therein, said computer readable program code adapted to implement a contract handling method relating to an executed master contract between a corporation and a company, said corporation comprising a plurality of units, said method comprising generating at least one statement of work (SOW) under the master contract, each SOW of the at least one SOW being associated with a corresponding unit of the plurality of units such that each SOW describes a project of its corresponding unit with the company, said generating comprising, for a SOW of the at least one SOW;

selecting one or more model agreements from a library of model agreements;

merging all or part of the one or more model agreements to form the SOW;

processing reminders of key dates for the SOW into tracking data;

storing the SOW and tracking data in a repository;

amending the master contract;

notifying all associated SOW owners of the at least one SOW of said amending; and wherein the master contract cannot be closed if any SOW of at least one SOW is still open.

21. The computer program product of claim 20, said key dates for the SOW being listed in the SOW.

22. The computer program product of claim 20, said method further comprising sending to the unit corresponding to the SOW a reminder of a first key date of the key dates, said reminder being automatically sent prior to an occurrence of the first key date.

23. The computer program product of claim 20, wherein the one or more model agreements were pre-approved by the corporation prior to said selecting such that further approval of the one or more model agreements by the corporation is not required to form the SOW.

24. The computer program product of claim 20, said at least one SOW being a plurality of SOWs, said method further comprising receiving an inquiry as to a status of each SOW of the plurality of SOWs.

25. The computer program product of claim 20, said method further comprising sending a notice to the corporation upon formation of the SOW from said merging, said notice indicating that the SOW has been formed.

26. The computer program product of claim 20, said selecting comprising selecting the one or more model agreements from model agreements in a plurality of languages.

27. The computer program product of claim 20, said method further comprising selecting one or more alternate clauses from a library of alternate clauses and replacing part of the selected one or more model agreements with said one or more alternate clauses.

28. The computer program product of claim 20, said method further comprising selecting a supplemental provision from a library of supplemental provisions and merging the supplemental provision into the SOW.

* * * * *